United States Patent [19]

Ragsdale et al.

[11] Patent Number: 5,731,398

[45] Date of Patent: Mar. 24, 1998

[54] BLACK COLORANT COMPOSITION EXHIBITING LOW FLAIRING

[75] Inventors: Mark Edward Ragsdale; David Jesse Moody, both of Spartanburg; Eric B. Stephens, Roebuck, all of S.C.

[73] Assignee: Milliken Research Corporation, Spartanburg, S.C.

[21] Appl. No.: 657,022

[22] Filed: May 31, 1996

[51] Int. Cl.[6] .......................... C08G 18/32; C08G 18/50; C08J 9/00

[52] U.S. Cl. .................. 528/73; 8/115.58; 8/515; 8/543; 8/691; 521/115; 521/116; 521/174; 521/176; 521/177; 521/163; 521/166; 521/167; 528/49; 528/74; 528/78; 528/79

[58] Field of Search .................... 528/49, 73, 74, 528/78, 79; 521/174, 115, 116, 177, 163, 166, 176, 167; 8/515, 543, 691, 115.58

[56] References Cited

U.S. PATENT DOCUMENTS

| | | | |
|---|---|---|---|
| 4,284,729 | 8/1981 | Cross et al. | 521/158 |
| 4,507,407 | 3/1985 | Kluger et al. | 521/113 |
| 4,751,254 | 6/1988 | Kluger et al. | 521/163 |
| 4,761,502 | 8/1988 | Kluger et al. | 564/442 |
| 4,775,748 | 10/1988 | Kluger et al. | 534/729 |
| 4,846,846 | 7/1989 | Rekers et al. | 8/515 |
| 4,912,203 | 3/1990 | Kluger et al. | 534/729 |
| 4,978,362 | 12/1990 | Kluger et al. | 18/506 |
| 5,290,921 | 3/1994 | Moody et al. | 534/607 |

*Primary Examiner*—Rabon Sergent
*Attorney, Agent, or Firm*—Terry T. Moyer; Timothy J. Monahan

[57] ABSTRACT

A black colorant composition useful for coloring polyurethanes is provided having a red benzothiazole azo colorant which, when combined with a complementary blue and yellow colorant, exhibits low flairing.

8 Claims, 1 Drawing Sheet

BLACK COLORANT COMPOSITION EXHIBITING LOW FLAIRING

BACKGROUND OF THE INVENTION

This invention relates to a black colorant composition which appears to have a substantially constant color, regardless of the light source. The colorant composition may be incorporated into a resin.

A material will appear black if substantially all of the light in the visible electromagnetic spectrum (400–700 nanometers) is absorbed. Thus, black colorant compositions may be mixtures of two, three or more individual colorants, which compliment each other to absorb light across the spectrum. For example, orange and blue; yellow, red and blue; and orange, blue and purple represent color combinations which will create a black composition.

In general, a black colorant composition made by combining two or more colorants will absorb electromagnetic radiation across the entire visible spectrum, but the absorbance at each wavelength may not be uniform. Consequently, the absorbance of such a composition may be represented by a series of peaks and valleys across the visible spectrum. The non-uniformity of the absorbance can result in the composition shifting color when the light source is changed.

One of the characteristics of a colorant composition is its color constancy or conversely, its tendency to change hue depending on the light source, referred to as flair or flairing. This change in appearance based on the light source is primarily due to the difference in spectral distribution between the light sources. The more energy emitted at a given wavelength, the more energy that must be absorbed by the individual colorants in the composition. Otherwise, light from that particular wavelength will be reflected by the substrate making the composition look different than when viewed under a light source that does not have the same spectral power distribution.

The tendency of some compositions to flair can be understood when one considers the difference in spectral power distribution between the illuminants "$D_{65}$", representing daylight, and "A", representing a tungsten light source, such as the normal incandescent light bulb. In color terminology $D_{65}$ would have a black body temperature of 6,504 degrees Kelvin while the "A" light would be described as having a black body temperature of 2,856K. The relative power distributions from these two light sources at the various wavelengths can be see in FIG. 1. Any light that is not absorbed is reflected by the substrate, causing the substrate to appear whatever shade the reflected wavelength would provide. For instance reflected light in the 400–430 nanometer range would appear violet. Similarly, reflectance in the ranges 430–480, 480–560, 560–590, 590–620, and 620–700 would appear blue, green, yellow, orange, and red respectively.

Flairing is observed in both individual colorants containing a single chromophore and colorant compositions. It has generally been believed that in order for a colorant composition to have low flairing, the individual colorant components should exhibit low flairing. Carbon black has been considered the standard for color constancy/low flairing for black colorants.

Colorants are commonly used in the manufacture of polyurethane foam. Poly(oxyalkylene) substituted colorants have been found to be particularly useful in that they may react with the polyisocyanate monomers and become permanently bound in the resin. Examples of such colorants may be found in the following United States patents:

| | |
|---|---|
| Cross et al. | 4,284,729 |
| Kluger et al. | 4,507,407 |
| Kluger et al. | 4,751,254 |
| Kluger et al. | 4,761,502 |
| Kluger, et al. | 4,775,748 |
| Rekers et al. | 4,846,846 |
| Kluger et al. | 4,912,203 and |
| Kluger et al. | 4,978,362 |

Note U.S. Pat. No. 4,751,254, Example 7, which reports that certain benzathiozole azo colorants are not stable in the presence of stannous octoate catalyst used in polyurethane foam production.

SUMMARY OF THE INVENTION

Therefore, an object of the invention is to provide a black colorant composition with low flairing. Further objects of the invention are to provide a black colorant composition which is relatively color constant under $D_{65}$ and incandescent (tungsten) light; a black colorant composition which may be used to color polyurethane foam; a black colorant composition comprised of a red, benzathiazole azo colorant; a black colorant composition comprised of two or more poly(oxyalkylene) substituted colorants.

Accordingly, a black colorant composition is provided having a red colorant of the formula:

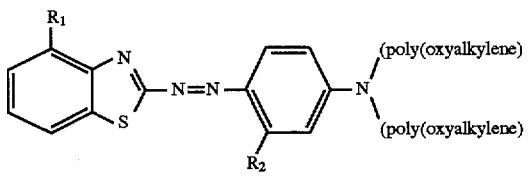

wherein $R_1$ is selected form H, $C_1$–$C_4$ alkyl, chloro and $C_1$–$C_4$ alkoxy, and $R_2$ is selected from H, Cl, $C_1$–$C_4$ alkyl, $C_1$–$C_4$ alkoxy and $CF_3$. The black colorant composition will also contain complimentary colorants for absorption of electromagnetic radiation across the visible spectrum, typically a blue and a yellow colorant. The red colorant, and preferably the complimentary colors, have poly (oxyalkylene) substituent groups which can react with a polyisocyanate during the reaction to make polyurethane. Thus, the present invention also includes a process for coloring resins, especially polyurethane resin, and the product made therefrom.

The invention features a red benzothiazole azo colorant, which by itself flairs significantly. Nevertheless, the red colorant has the benefit of combining with the complementary colorants in the black composition to offset flairing. The red colorant has been demonstrated to reduce flairing with a broad range of complementary colorants including those from the methine, azo, triphenylmethane, anthraquinone and phthalocyanine classes.

DETAILED DESCRIPTION OF THE INVENTION

Figure 1:
FIG. 1 is a graph of the intensity of a light source ($D_{65}$ or "A" tungsten incandescent) in microwatts versus wavelength over the range of the visible spectrum.

Without limiting the scope of the invention, the preferred embodiments are hereinafter set forth. Unless otherwise indicated, all parts and percentages are by weight, conditions are ambient, i.e. one atmosphere of pressure at 25° C., aliphatic hydrocarbons are from 1 to 12 carbons is length and cycloaliphatic hydrocarbons comprise from 3 to 8 carbon atoms. The terms aryl and arylene are intended to be limited to single and fused double ring hydrocarbons.

All of the patents and documents cited in the specification are hereby incorporated by reference.

The individual colorants and colorant compositions can be characterized by CIE L*a*b* coordinates derived from the CIE (1976) L*a*b* Color Space System. The difference in color space observed for the same colorant or same composition resulting from two different light sources is reported as the relative flair or flairing and is referred to as the $\Delta_{ab}$ in two dimensional CIE Color Space. The following equation was used to calculate $\Delta_{ab}$ where $D_{65}$ represents a source having a black body or correlated color temperature of 6,504° K and "A" represents an tungsten incandescent bulb having a black body temperature of 2,856° K:

$$\Delta_{ab}=[(a*_{D65}-a*_A)^2+(b*_{D65}-b*_A)^2]^{1/2}$$

A black colorant composition is defined as a circle around the origin of CIE L*a*b* color space, with a* and b* values each of ±20, preferably ±10, most preferably ±5.

The black colorant composition of the present invention contains at least 10 wt. %, preferably at least 20 wt. % of a benzothiazole azo colorant. The benzothiazole ring is substituted in the "4" position with a H, $C_1$–$C_4$ alkyl, chloro or $C_1$–$C_4$ alkoxy group. The benzothiazole moiety is coupled to an N, N poly(oxyakylene) substituted aniline compound, which may be substituted at the "2" position with H, $C_1$–$C_4$ alkyl $C_1$–$C_4$ alkoxy or $CF_3$. Additional substitutions may be made on either the benzothiazole or aniline component of the colorant provided that the peak absorption is from 465 to 540 nanometers.

Red colorants having the following formula may be employed:

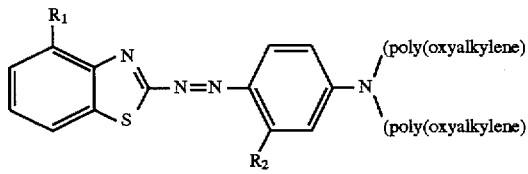

wherein $R_1$ is selected from H, $C_1$–$C_4$ alkyl, chloro and $C_1$–$C_4$ alkoxy, $R_2$ is selected from H, Cl, $C_1$–$C_4$ alkyl, $C_1$–$C_4$ alkoxy and $CF_3$, and each poly(oxyalkylene) substituent is an oligomer or polymer of $C_2$–$C_4$ alkylene oxides. Preferably $R_1$ is methyl or ethyl and $R_2$ is H, methyl or ethyl.

The poly(oxyalkylene) substituents are each comprised of from 2 to 200, preferably 3 to 100, most preferably 5 to 50, residues of $C_2$–$C_4$ alkylene oxides. Suitable alkylene oxides include ethylene oxide, propylene oxide and butylene oxide. Branching of the substituent may be accomplished by initially including glycidol or chloropropane diol groups in the sequence, thereby including multiple hydroxyl sites, as is disclosed in Moody et al. U.S. Pat. No. 5,290,921. Those with skill in the art will recognize that minor amounts of compatible monomers may also be included in the substituent group. The poly(oxyalkylene) substituent will typically have a molecular weight of from 88 to 5000, preferably 250 to 3000.

The above described benzothiozole red colorant may be combined with other red colorants in the black composition.

The benzothiazole colorant will constitute greater than 50 wt. %, preferably greater than 75 wt. % of the components in the composition having a peak absorbance of from 465 to 540 nanometers.

In addition to the red component, the black colorant composition contains the complementary colorants necessary to absorb electromagnetic radiation across the visible spectrum. Accordingly, the composition contains a yellow colorant having a peak absorbance between 400 and 465 nanometers and a blue colorant having a peak absorbance between 540 and 700 nanometers. The yellow and blue colorants preferably each have at least two poly(oxyalkylene) substituent groups as defined above.

Suitable yellow colorants include methine and azo colorants, especially the poly(oxyalkylene) substituted colorants desclosed in U.S. Pat. Nos. 4,627,939, 4,658,064, 4,981,516 and 4,284,729.

Suitable blue colorants include triphenylmethane, azo, phthalocyanine and anthraquinone colorants, especially the poly(oxyalkylene) substituted colorants disclosed in U.S. Pat. Nos. 4,871,371, 5,043,013, 5,059,244, 5,270,363, 5,177,200, 5,149,800, 4,732,570, 4,640,690, 4,284,729, 4,137,243, 4,170,564, and 4,846,846.

In an alternative embodiment of the invention, the black composition also contains a violet colorant having a peak absorbance between 540 and 580 nanometers. Suitable violet colorants include azo colorants, especially the poly(oxyalkylene) substituted azo colorants disclosed in U.S. Pat. Nos. 4,507,407, 4,912,203, 4,775,748, 4,812,141 and 4,978,362.

The black colorant composition may be provided neat, as an aqueous solution or in an organic solvent. The solubility of the colorant may be adapted to a particular application by varying the relative hydrophilic/lipophilic character of the poly(oxyalkylene) substituent as is disclosed in Hauser et al. U.S. Pat. No. 4,113,721 and the references cited herein. Regardless of the presence of a solvent or diluent, the colorant components of black colorant composition may be formulated in the following molar ratios:

from 10 to 60 parts of a red colorant;
from 10 to 60 parts of a yellow colorant and;
from 10 to 60 parts of a blue colorant.

In an alternate embodiment, the composition also includes form 2 to 20 parts of a violet colorant.

The individual colorants comprising the black colorant composition may be provided with an electrophilic group on the poly(oxyalkylene) substituents, preferably in the terminal position. For example, the poly(oxyalkylene) substituent may terminate with an hydroxy, mercapto or amino group, preferably an hydroxy group.

The black colorant composition containing "reactive" colorants finds utility in coloring polymeric resins. In particular, the colorant composition may be present during a polycondensation reaction or polyaddition reaction, and become covalently bonded into the polymer, for examples, in place of a polyol monomer. Suitable reaction systems include polyol/polyisocyante used to make polyurethane; polyol/polyacid (including acid chlorides and esters) used to make polyester; and polyamine/polyacid used to make polyamides. Additional reaction systems include those used to make alkyds, allylics, aminos, e.g. melamine and urea, epoxies, phenolics and silicones. Those with skill in the art will recognize that the colorant may be added to the reaction system after polymerization is substantially complete, and the colorant will "cap" the polymer chains. The procedures for coloring resins with the black colorant composition may be found in the references cited herein, especially Cross et al., U.S. Pat. No. 4,284,729.

Of particular interest is the coloration of polyurethane resin. The process for synthesizing polyurethane resin is well known in the art and may be found in the "Encyclopedia of Polymer Science and Engineering" vol. 13, pp. 243–296, John Wiley & Sons, Inc. (1988). Generally, polyurethanes are addition polymers formed by the exothermic reaction of a polyisocyanate with a polyol. The rate of reaction is influenced by the structure and functionality of the monomers, stearic hindrance and whether the hydroxyl groups are primary or secondary. Typically, a catalyst, such as stannous octanoate and amine catalysts, is incorporated in the reaction mixture. Depending on the application, that is whether the polyurethane resin is a soft, semi-rigid or rigid foam, coating or elastomer, the reaction mixture may include surfactants, blowing agents and ancillary processing aids.

The black colorant composition may be conveniently added to a polymerization reaction mixture by first blending the colorant with the polyol and then introducing the polyol to the mixture. In another method, the colorant composition may be metered directly into the reaction mixture. The black colorant composition may be incorporated into the polymer resin at a concentration of from 0.001 to 15 wt. %, preferably 0.1 to 5 wt. %.

The invention may be further understood by reference to the following examples.

Testing

All of colorants and colorant compositions were incorporated into polyurethane foam and the CIE L*a*b* coordinates were measured with a Datacolor SS-II color spectrophotometer. The measurements were taken once under a $D_{65}$ light source and then again under a tungsten incandescent light source (black body temperature 2,856K) designated source "A". The intensity versus wavelength for each of the sources is plotted in FIG. 1.

The difference in color space observed for a colorant composition resulting from the two different light sources is reported as $\Delta_{ab}$ of the flairing. As reported herein, the $\Delta_{ab}$ is based upon a comparison under $D_{65}$ and "A" light sources only. Preferably, the black colorant compositions of the present invention have a $\Delta_{ab}$ of less than 1.5, more preferably a $\Delta_{ab}$ of less than 1.0 and most preferably a $\Delta_{ab}$ of less than 0.5.

EXAMPLE 1

This example demonstrates formulation of a black colorant composition, use of the composition to color polyurethane foam and determination of $\Delta_{ab}$.

Black Colorant Composition

A red colorant having the following formula was synthesized according to Kluger et al. U.S. Pat. No. 4,751,254, Example 5:

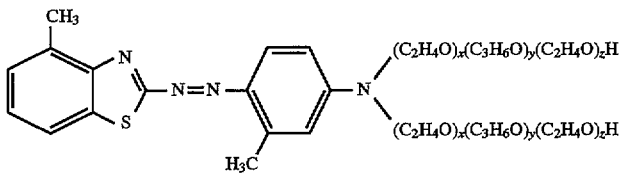

The red colorant had a $\lambda_{max}$ of 523 nm and a $\Delta_{ab}$ of 13.7.

A yellow colorant having the following formula was synthesized according to Kluger et al. U.S. Pat. No. 4,981,516, Example 20:

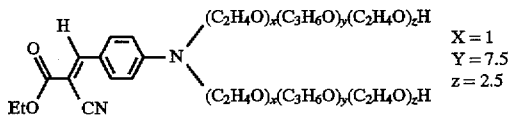

The yellow colorant had a $\lambda_{max}$ of 423 nm and a $\Delta_{ab}$ of 13.5.

A blue colorant having the following formula was synthesized according to Harris U.S. Pat. No. 4,871,371, Example 9:

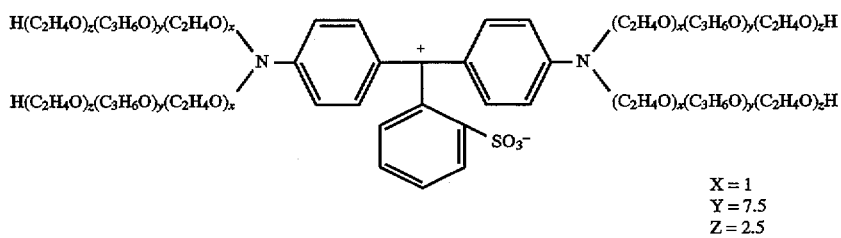

The blue colorant had a $\lambda_{max}$ of 628 nm and a $\Delta_{ab}$ of 11.4.

The colorants were blended together in a black composition in the following ratios:

red . . . 31.1 parts by weight yellow . . . 24.4 parts by weight blue . . . 44.5 parts by weight.

Polyurethane Synthesis

One part of the black colorant composition was added to 100 parts of an ether triol (mw~3,000), which was mixed with 4.53 parts water, 1.0 part silicone surfactant, 0.15 parts stannous octoate catalyst and 0.05 parts triethylene diamine. Next, 58.8 parts toluene diisocyanate (80/20) was allowed to react at ambient conditions for approximately three minutes and allowed to cool. A black colored polyurethane foam having a density of 1.5 lbs./ft$^3$ was produced.

$\Delta_{ab}$ Determination

CIE L*a*b* coordinates were measured under $D_{65}$ and "A" light sources and found to be (a*=1.2, b*=−2.27) and (a*=1.12, b*=−2.14), respectively. The value of $\Delta_{ab}$ was calculated to be 0.153.

EXAMPLE 2

The following example demonstrates incorporation of a violet colorant into the black colorant composition of Example 1.

A violet colorant having the following formula was synthesized according to Kluger et al. U.S. Pat. No. 4,507,407:

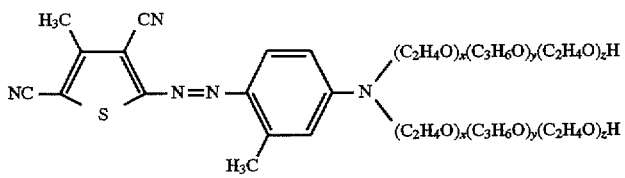

X = 1
Y = 7
z = 4

The violet colorant had a $\lambda_{max}$ of 571 nm and a $\Delta_{ab}$ of 7.6.

A black colorant composition was made by blending the following colorants:

violet (Ex. 2) . . . 7.2 parts by weight
red (Ex. 1) . . . 27.2 parts by weight
yellow (Ex. 1) . . . 29.0 parts by weight
blue (Ex. 1) . . . 36.6 parts by weight.

One part of the black composition was substituted in the polyurethane reaction mixture of Example 1 to produce a black colored polyurethane foam.

The value of $\Delta_{ab}$ for the foam was calculated to be 0.953.

EXAMPLE 3

The following example demonstrates that the yellow methine colorant of Example 1 may be replaced with a yellow azo colorant to produce a low flairing black composition.

A yellow colorant having the following formula was synthesized according to Cross et al. U.S. Pat. No. 4,284,729, Example I:

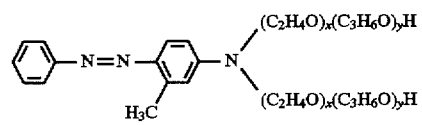

X = 2.5
Y = 2.5

The yellow colorant had a $\lambda_{max}$ of 429 nm and a $\Delta_{ab}$ of 6.57.

A black composition was made by blending the following colorants:

red (Ex. 1) . . . 32.2 parts by weight
yellow (Ex. 3) . . . 21.8 parts by weight
blue (Ex. 1) . . . 46.0 parts by weight.

One Part of the black colorant composition was substituted in the polyurethane mixture of Example 1 to produce a black colored polyurethane foam.

The value of $\Delta_{ab}$ for the foam was calculated to be 0.796.

EXAMPLE 4

The following example demonstrates that the blue triphenylmethane colorant of Example 1 may be replaced with a blue phthalocyanine colorant to produce a low flairing black composition.

A blue colorant having the following formula was synthesized according to Kluger et al. U.S. Pat. No. 5,177,200:

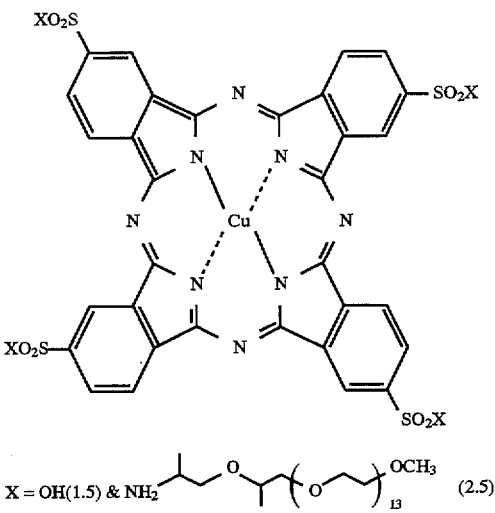

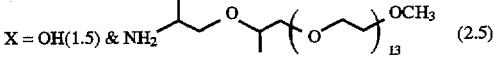

(2.5)

The blue colorant had a $\lambda_{max}$ of 666 nm and a $\Delta_{ab}$ of 10.8.

One part of the black colorant composition was substituted in to the polyurethane mixture of Example 1 to produce a black colored polyurethane foam.

The value of $\Delta_{ab}$ for the foam was calculated to be 1.36. One observes an increase in the $\Delta_{ab}$ value as the level of the red colorant of the present invention decreases.

EXAMPLE 5

(Comparative)

The following comparative example demonstrates that substituting a single orange colorant for the red and yellow colorants of Example 2 has a detrimental effect on flairing in the resulting black composition.

An orange colorant having the following formula was synthesized according to Baungartner et al., U.S. Pat. No. 4,640,690, Example 5, except that the terminal group was hydrolyzed leaving an hydroxl group:

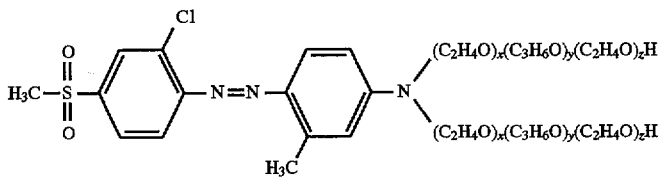

The orange colorant had a $\lambda_{max}$ of 471 nm and a $\Delta_{ab}$ of 13.79, which is comparable to the $\Delta_{ab}$ values of the red colorant and yellow colorant of Example 2, which were 13.7 and 13.5 respectively.

A black composition was made by blending the following colorants:

orange (Ex. 5) . . . 46.6 parts by weight;
blue (Ex. 1) . . . 37.2 parts by weight;
violet (Ex. 2) . . . 16.2 parts by weight.

One part of the black colorant composition was substituted in the polyurethane mixture of Example 1 to produce a black colored polyurethane foam.

The value of $\Delta_{ab}$ for the foam was calculated to be 1.955, which is significantly above the levels achievable with the red colorant of the present invention and represents a visually observable shade shift.

There are, of course, many alternate embodiments and modifications of the invention, which an intended to be included in the following claims.

What we claim is:

1. A process for polymerizing a mixture of a polyol and a polyisocyanate to form a polyurethane comprising the steps of:

(a) providing a black colorant composition in the mixture prior to the polymerization reaction, wherein the composition comprises (i) at least 10 wt. % of a red colorant having the formula:

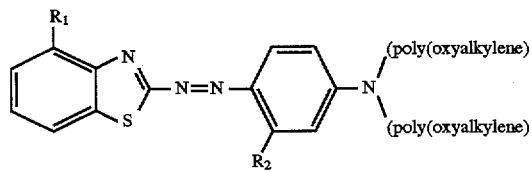

wherein $R_1$ is selected from the group consisting of H, $C_1$-$C_4$ alkyl, $C_1$-$C_4$ alkoxy and chloro, $R_2$ is selected from the group consisting of H, $C_1$-$C_4$ alkyl, $C_1$-$C_4$ alkoxy and $CF_3$, having a peak absorption from 465 to 540 nanometers; (ii) a poly(oxyalkylene) substituted blue colorant selected from the group consisting of triphenylmethane, phthalocyanine, anthraquinone and azo colorants, having a peak absorption between 540 and 700 nanometers; and (ii) a poly(oxyalkylene) substituted yellow colorant selected from the group consisting of methine and azo colorants having a peak absorption between 400 and 465 nanometers, wherein the poly(oxyalkylene) substituents are each comprised of from 2 to 200 residues of $C_2$-$C_4$ alkylene oxides and have a group selected from hydroxy, mercapto or amino groups in the terminal position; and (b) polymerizing the reaction mixture, whereby the colorants form covalent bonds with the polyisocyanate and are incorporated into the backbone of the polyurethane.

2. The process of claim 1 wherein the black colorant composition has a $\Delta_{ab}$ of less than 1.5 in CIE L*a*b* coordinates between $D_{65}$ and tungsten incandescent light.

3. The process of claim 1 wherein the black colorant composition has a $\Delta_{ab}$ of less than 1.0 in CIE L*a*b* coordinates between $D_{65}$ and tungsten incandescent light.

4. The process of claim 3 wherein $R_1$ is methyl and $R_2$ is H, methyl and ethyl the poly(oxyakylene) substituent is comprised of from 5 to 50 residues of the alkylene oxide, the blue colorant is a triphenyl methane colorant, the yellow colorant is a methine colorant, and each of the poly(oxyalkylene) substituents are hydroxy terminated.

5. A black polyurethane composition obtained by the process of claim 1.

6. A black polyurethane composition obtained by the process of claim 2.

7. A black polyurethane composition obtained by the process of claim 3.

8. A black polyurethane composition obtained by the process of claim 4.

* * * * *